Aug. 16, 1949.   H. A. LILJENBERG   2,479,538
VEHICLE
Filed March 7, 1949

INVENTOR.
HARRY A. LILJENBERG
BY
ATTORNEY

Patented Aug. 16, 1949

2,479,538

UNITED STATES PATENT OFFICE 2,479,538

VEHICLE

Harry A. Liljenberg, Cleveland, Ohio, assignor to Midwest Industries, Inc., Cleveland, Ohio, a corporation of Ohio Application March 7, 1949, Serial No. 80,055

7 Claims. (Cl. 280—282)

1

This invention relates to an improved vehicle, and more particularly a tricycle, kiddie car, or other three-wheeled vehicle. It includes an improved front and frame structure.

In a preferred structure for a tricycle, kiddie car or the like, the frame consists essentially of two members the front ends of which are attached to means supported by the steering column. Their rear ends extend backwardly to the rear wheels. These frame members may be of any cross-sectional shape, but seamless tubular members are preferred because of their lightness and strength. The frame tubes are preferably formed of a light metal such as aluminum or magnesium which is easily shaped but they may be of steel if a stronger construction is desired. The tubes are secured at the front of the vehicle by bolts so that the front and rear portions of the vehicle may be disconnected when shipping the vehicle from the factory to a distributor.

The frame members extend backwardly from their point of attachment in a horizontal plane, close together and substantially parallel to each other. A seat adjustably supported on the parallel portion of the frame members may be located forward or back to accommodate children of different sizes. Toward the rear of the vehicle the frame members slope downwardly and then flare outwardly. The rear wheels of the vehicle are attached to these outwardly directed ends of the frame members. In vehicles for smaller children these ends may be reduced to form axles for the rear wheels. For larger children other types of rear wheel supports are provided. At the front of the vehicle, the steering column is rigidly connected to a fork in which the front wheel assembly is installed.

These novel constructions are especially suited for large volume production. The parts are easily fabricated and expensive welding operations are avoided.

The drawings are illustrative of a preferred form of the invention. In the drawings.

2

Figure 1:
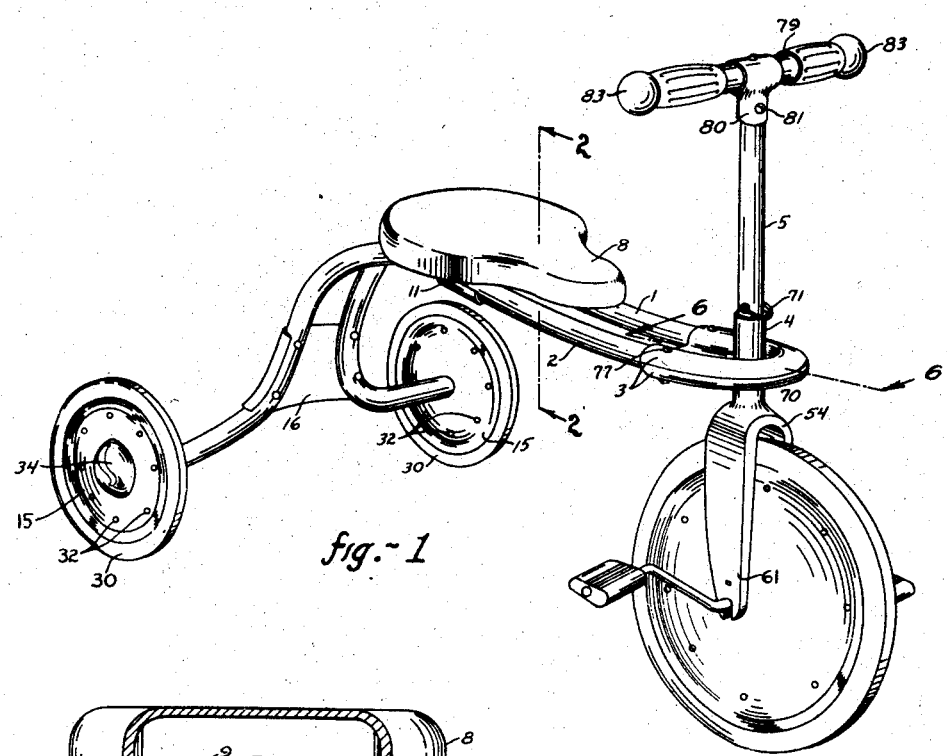
Fig. 1 is a perspective view of a tricycle.

The frame of the tricycle shown in Fig. 1 consists of two tubular members 1 and 2. The front end of each of these tubes is bolted between the plates 3 which are secured around the vertical sleeve 4. The sleeve journals the vertical steering column 5.

The tubes 1 and 2 extend rearwardly from between the plates 3. Along this section of the frame these tubes 1 and 2 are parallel and are substantially horizontal. A saddle 8 is mounted on this parallel section.

Figure 2:
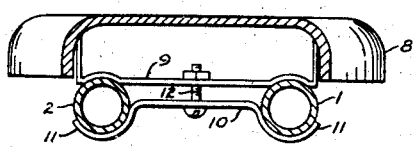
Fig. 2 is a sectional view on the line 2—2 of Fig. 1, showing adjustable mounting means for the saddle.

Fig. 2 shows a preferred mounting means for saddle 8 so that it may be adjusted back and forth along the tubes. A bracket 9 is attached to the underside of the saddle and is shaped with a radius at each side to fit tubes 1 and 2. A plate 10 having channels 11 formed along each outer side with a curvature to fit the lower sides of tubes 1 and 2 is attached to the bracket 9 by the bolt 12. The saddle may be secured to the frame tubes at any desired point by tightening bolt 12.

Toward the rear of the tricycle the tubes 1 and 2 are bent gradually away from each other and downwardly. The rear ends of tubes 1 and 2 are then directed outwardly from each other in opposite directions. These ends extend substantially horizontally and perpendicularly to the aforesaid parallel sections of the tubes. Rear wheels 15 are attached to each of these outwardly extending ends, the ends being the axles for the wheels. A plate 16 is provided at the point where tubes 1 and 2 separate from each other, to strengthen the frame.

Figure 3:
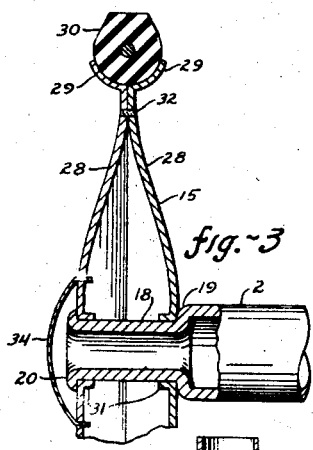
Fig. 3 is a sectional view of a rear wheel assembly preferred in smaller vehicles.

In the rear wheel assembly shown in cross section in Fig. 3, axle 18 is formed at the end of each frame tube 1 and 2, preferably, by rolling these ends between suitable dies until the original diameter of the tube is reduced to the proper size. Rolling the ends reduces the diameter of the tube but does not substantially reduce its wall gauge. The rolling operation forms the shoulder 19 on each tube against which the wheels 15 bear. Axle 18 may also be formed on the ends of the tubes by turning them down to the desired diameter.

After wheel 15 is positioned on axle 18 a portion of the axle will extend a slight distance beyond the hub of the wheel. This extending portion may be spun over or peened outwardly to form the bead 20. Wheels 15 are thus retained on the axle 18 between bead 20 and shoulder 19. This inexpensive assembly may be used in vehicles for smaller children.

For some models of these vehicles, removable wheels are desirable. Also, for heavier children such as will use the larger tricycles, a stronger construction is required. Preferred removable mountings are illustrated in Figs. 4 and 5.

Figure 4:
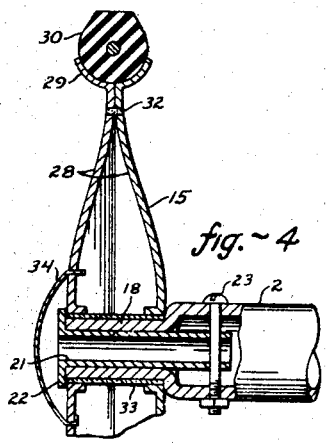
Figs. 4 and 5 are sectional views of preferred rear wheel assemblies in which the wheels are removable.

In Fig. 4 the axle 18 is formed at the ends of tubes 1 and 2 in the manner described above. After a wheel is positioned on axle 18 a plug 21 having a flange 22 at the outer end is inserted inside tubular axle 18 and is secured therein by passing a bolt 23 through holes in the walls of the tube and through holes in plug 21. In this mounting, wheel 15 is retained between the flange 22 on the plug 21 and the shoulder 19 on the frame tubing.

Figure 5:
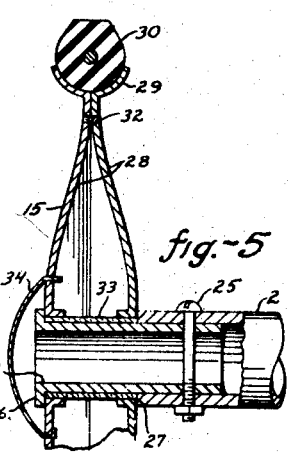

In Fig. 5, the axle for wheel 15 is a cylindrical plug 24, preferably of steel or the like, which passes through the hub of the wheel and extends into the end of the tube to which the wheel is attached. The diameter of plug 24 is about equal to the internal diameter of the tube. Plug 24 is adapted to fit snugly into the tube but with sufficient clearance to be easily slipped out of the tube when the wheel 15 is to be removed. The plug 24 is held in the tube by a bolt 25. At the outer end of plug 24 there is an outwardly protruding flange 26. Wheel 15 rotates on the surface of plug 24 and is retained thereon between flange 26 and the end 27 of the tube. The ends of tubes 1 and 2 need not be reduced in diameter to effect this assembly.

Rear wheels 15 are composed of two disks 28 (Fig. 3) which may be conveniently stamped from flat steel sheets. They are of dish-like shape and are joined together near their rims. A flange 29 forms the outer rim of each disk. The flanges 29 on each disk cooperate to hold a solid rubber tire 30 between them when the two disks are assembled face to face. An annular flange 31 is formed around the hole through the center of each disk 28. When the wheel is assembled the flanges 31 on the disks will be turned inwardly toward each other. The inwardly facing surfaces of the flanges 31 provide the bearing surfaces for the wheel. The disks 28 will be riveted or spot welded together at 32, where the disks are brought into contact just inside the flanges 29.

Bearings may be provided in the hubs of wheels 15 but they are not necessary for vehicles for smaller children. However, to reduce the wear on the axle caused by the rubbing action of the steel flanges 31, a bushing 33 (Figs. 4 and 5) preferably of plastic material, may be slipped around the axle to provide a bearing surface for flanges 31. Such a bushing may likewise be used to advantage in the cheaper structure shown in Fig. 3. A hub cap 34 covers the end of the axle after the wheel is installed.

Steering column 5 is rigidly fastened in a collar 70 at the top of fork 54. The front fork may be stamped or formed in two pieces as will be explained herein. Column 5 is preferably tubular and is journaled in vertical sleeve 4. The column 5 extends upwardly through sleeve 4, the lower edge of sleeve 4 resting on the upper edge of collar 70 and being supported thereby. Above sleeve 4 a ring 71 (Fig. 1) is inserted through column 5 to prevent excessive axial movement of the column in the sleeve.

Figure 6:
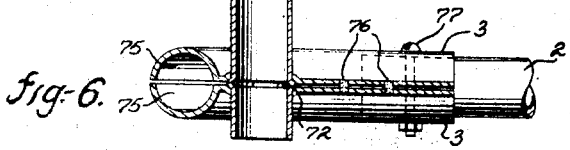
Fig. 6 is a sectional view on the line 9—9 of Fig. 1.

Sleeve 4 may be formed by rolling a flat metal sheet to a cylindrical shape or it may be a short piece of seamless tubing. Around its outer surface there is a bead 72 (Fig. 6). Each gusset plate 3 is a U-shape with a U-shape recess 75, semi-circular in cross-section, extending around its outer edge. There is a hole through the center portion of each plate so that the plate may be fitted around sleeve 4 substantially perpendicular to the axis of the sleeve. Gusset plates 3 are fitted over opposite ends of sleeve 4 and are brought together in contact with bead 72. Plates 3 are then spot welded to each other at points 76 (Fig. 6) and at the connection of sleeve 4 and the plates 3. Bead 72 on sleeve 4 serves to locate the plates properly and permits the sleeve 4 to be held more firmly by the plates 3. Gusset plates 3 are positioned around sleeve 4 so that the U-shaped recess 75 around their edges forms a tubular channel around the sleeve 4. The forward ends of frame tubes 1 and 2 are inserted into the open ends of this channel and are secured therein by bolts 77.

At the upper end of column 5 there is a cross bar 79 (Fig. 1) which extends perpendicularly to column 5 and which is used to turn front wheel 36 and steer the vehicle. Steering bar 79 is secured to column 5 by a suitable bracket 80 which is bolted at 81 to the top of column 5. Rubber steering grips 83 are provided at each end of steering bar 79.

Forks of other designs may be used rather than cast fork 54.

Various combinations of these novel assemblies may be made so that different models of vehicles are produced. For example, a kiddie car may be made by fastening the gusset plate and sleeve assembly shown in Fig. 6 to the frame members with the longer end of sleeve 4 extending downwardly. The front wheel of a kiddie car is preferably the size of the rear wheels 15 of Fig. 1. The wheel may be held in the fork with any suitable axle passing therethrough. Cranks and pedals are not used with a kiddie car.

This and other such obvious modifications may be made which are within the scope of the claims.

What I claim is:

1. A three-wheeled vehicle comprising frame members supporting rear wheels of the vehicle, a fork having a front wheel positioned therein, a steering column secured on the fork and extending upwardly therefrom, a sleeve adapted to journal the steering column, plates positioned around the sleeve and extending perpendicularly therefrom, said plates uniting to form a channel to receive the forward end of each frame member and means for securing said ends therein.

2. A three-wheeled vehicle having two frame members extending longitudinally thereof, a front wheel positioned in a fork, a steering column secured to said fork and extending upwardly therefrom, a sleeve journaling the steering column above the fork, plates secured around the sleeve with means fastening the forward ends of the frame members thereto, said frame members sloping downwardly toward the rear of the vehicle and flaring outwardly, and a wheel fastened to each outwardly flaring end.

3. A three-wheeled vehicle, with the front wheel positioned in a fork, a steering column extending upwardly from the fork, a frame formed with two tubular members to the rear of which the two wheels are fastened, and two plates supported around the steering column in a plane substantially perpendicular thereto with a U-shaped concavity of semi-circular cross section around the edge of each plate, the plates being positioned with the concavities in mating relation and with the bottom of the U in front of the steering channel and the legs of the U opening toward the rear of the vehicle, and with the front ends of the tubular members fastened in said openings.

4. A three-wheeled vehicle with a front wheel positioned in a fork, a steering column extending upwardly from the fork, a frame formed with two tubular members the forward portions of which are parallel and horizontal and the rear portions of which extend downwardly and outwardly, a saddle fastened to the horizontal parallel portions, two rear wheels fastened to said outwardly extending portions of the tubular members, and supported by the steering column, means formed with two backwardly facing openings in the rear thereof into which the forward ends of the tubular members are adapted to fit and means for fastening them therein.

5. An assembly adapted for use in a three-wheeled vehicle with one front wheel and above it a steering column fastened to it and a frame on which the rear wheels are mounted, which assembly comprises a sleeve adapted to encircle the steering column, a bead on the outer surface of the sleeve in a plane perpendicular to the sleeve and nearer one end of the sleeve than the other, plates each extending across the front of the steering column and fastened together with each plate fitting against said bead, and means at the rear of the plates for attachment to the frame.

6. An assembly formed of a sleeve and two identical plates, the sleeve being adapted to fit snugly around the steering column of a vehicle, each plate being symmetrical and formed with a U-shaped concavity in one surface, the plates being united with the concavities in mating relation, and means on the outer surface of the sleeve which cooperate with the plates at their meeting line to position the plates on the sleeve.

7. A tricycle, kiddie car or the like, the frame of which consists essentially of two tubular members formed of light metal, a substantial length of a forward portion of each of the tubular members being substantially horizontal and close to the substantially horizontal forward portion of the other tubular member, a saddle supported by said close-together, substantially horizontal portions of the tubular members, the tubular members sloping downwardly toward the rear of the vehicle with their ends flaring outwardly and lying widthwise of the vehicle, two rear wheels fastened to the respective tubular members at their outwardly flaring ends, the axis of each rear wheel and the axis of the outwardly flaring end of each tubular member being in a straight line, and a front wheel which carries means which supports the forward end of each tubular member.

HARRY A. LILJENBERG.

REFERENCES CITED

The following references are of record in the file of this patent:

UNITED STATES PATENTS

| Number | Name | Date |
| --- | --- | --- |
| 70,056 | Wheelock | Oct. 22, 1867 |
| 381,144 | Kohler | Apr. 17, 1888 |
| 624,442 | Baker | May 9, 1899 |
| 678,413 | Leyland | July 16, 1901 |
| 1,106,939 | Gutman | Aug. 11, 1914 |
| 1,290,174 | Graham | Jan. 7, 1919 |
| 2,186,561 | Snell | Jan. 9, 1940 |
| 2,333,642 | Dempsey et al. | Nov. 9, 1943 |
| 2,335,583 | Conti | Nov. 30, 1943 |

FOREIGN PATENTS

| Number | Country | Date |
| --- | --- | --- |
| 850,970 | France | Sept. 25, 1939 |